United States Patent [19]
Marsh

[11] Patent Number: 5,441,179
[45] Date of Patent: Aug. 15, 1995

[54] ULTRA-VIOLET DISINFECTING DEVICE ADAPTED FOR USE WITH BOTTLED WATER DISPENSER

[76] Inventor: Stephen A. Marsh, 21 Payson Estate 456 Belmont St., Watertown, Mass. 02172

[21] Appl. No.: 245,367

[22] Filed: May 18, 1994

[51] Int. Cl.$^6$ ............................................. B67D 5/58
[52] U.S. Cl. .............................. 222/190; 222/185.1; 210/172; 210/748; 250/432 R
[58] Field of Search ...................... 222/190, 185, 146.6; 210/172, 251, 748; 250/432 R, 435

[56] References Cited

U.S. PATENT DOCUMENTS

| | | | |
|---|---|---|---|
| 1,881,929 | 10/1932 | Pottenger, Jr. | 222/185 |
| 4,528,093 | 7/1985 | Winer | 210/96.2 |
| 4,623,467 | 11/1986 | Hamlin | 210/748 X |
| 4,801,375 | 1/1989 | Padilla | 222/190 X |
| 4,969,991 | 11/1990 | Valadaz | 210/96.2 |
| 5,112,477 | 5/1992 | Hamlin | 222/146.6 X |
| 5,316,673 | 5/1994 | Kohlmann et al. | 222/190 X |

Primary Examiner—Gregory L. Huson
Attorney, Agent, or Firm—Cesari and McKenna

[57] ABSTRACT

An apparatus for disinfecting water in a water cooler holding tank by using an ultra-violet radiation to eliminate biological growth. The apparatus includes a bottle positioning collar that adapts to the base unit of a standard water cooler adjacent where the neck of an inverted water bottle is supported by the base unit. Incorporated within the collar is an ultra-violet lamp assembly, which under control of an electrical supply unit, periodically exposes the water standing in the holding tank to disinfecting ultra-violet radiation. The collar may include a transparent window which may be easily accessed for cleaning when the water bottle has been removed.

8 Claims, 3 Drawing Sheets ic # ULTRA-VIOLET DISINFECTING DEVICE ADAPTED FOR USE WITH BOTTLED WATER DISPENSER

FIELD OF THE INVENTION

This invention relates generally to water dispensers, and more particularly to an apparatus for providing purified drinking water from a water cooler making use of bottled water and a holding tank with a ultra-violet (UV) disinfecting light source that may be easily cleaned.

BACKGROUND OF THE INVENTION

Many different types or equipment exists for dispensing purified drinking or spring water from storage bottles. As is widely known, in such a water cooler apparatus, a water bottle is inverted and placed within a free-standing base unit. The base unit includes a holding tank and a valve spigot, or other delivery device which is operated to dispense the water as needed, typically via gravity.

While the water is originally delivered to the user in a clean and sealed bottle, a water cooler is typically located in an office, factory floor, or other environments which may contain unhealthy bacteria in the air or other ambient environmental conditions that may foster the growth of undesirable microorganisms. This, in turn, means that undesirable biological growth may occur in the holding tank, and as time elapses, this eventually contaminates the water as it is dispensed from the bottle.

Most users of bottled water dispensers do not clean the inside of the holding tank for various reasons. This may include ignorance of the fact that bacteria is growing therein, or, even if the user knows of the hazard, human nature being what it is, the time is not taken to perform the task. This is because gaining access to the holding tank of a standard water cooler may be difficult. As a result, this lack of cleaning leaves the holding tank in an unsanitary condition, and defeats the purpose of providing bottled water in a clean and sealed condition in the first place.

Certain persons have previously recognized the problem of bacteria formation within the holding tank of a free-standing water cooler system. For example, U.S. Pat. No. 4,322,291 issued to Ho, discloses a water dispenser consisting of a series of transparent concentric plates. The center section of the tank is provided with a transverse-mounted transparent protecting tube within which is located in ultra-violet (UV) lamp, which serves to sterilize the water. The apparatus shown in that patent thus requires the use of a special multi-section tank, which includes a series of concentric transparent plates. The vast majority of water cooler systems in use do not have such a holding tank, and therefore may not easily be retrofitted without undue cost.

What is needed is a way to retrofit existing water cooler systems whereby the stagnant water standing in the holding tank might be disinfected, such as by automatically exposing the tank to UV light, without the need to retrofit or redesign the holding tank itself.

SUMMARY OF THE INVENTION

The invention is an apparatus for improving the quality of water dispensed from a water cooler by using ultra-violet radiation to disinfect the surface of the the holding tank, the water in the holding tank, and the surrounding air, thereby eliminating biological growth. In particular, the invention includes a water guard or bottle positioning collar that easily adapts to the base unit of a water cooler adjacent where the neck of the inverted bottle is supported by the base unit, incorporated within the collar, an ultra-violet lamp assembly, which exposes the water standing in a holding tank to a disinfecting ultra-violet light source at periodic intervals.

The collar may include a transparent window which may be easily accessed or even removed on a regular basis for cleaning, such as during bottle replacement.

BRIEF DESCRIPTION OF THE DRAWINGS

The present invention is described with greater particularity in the following detailed description of a preferred embodiment, together with the accompanying drawings, in which.

DETAILED DESCRIPTION OF A PREFERRED EMBODIMENT

Figure 1:
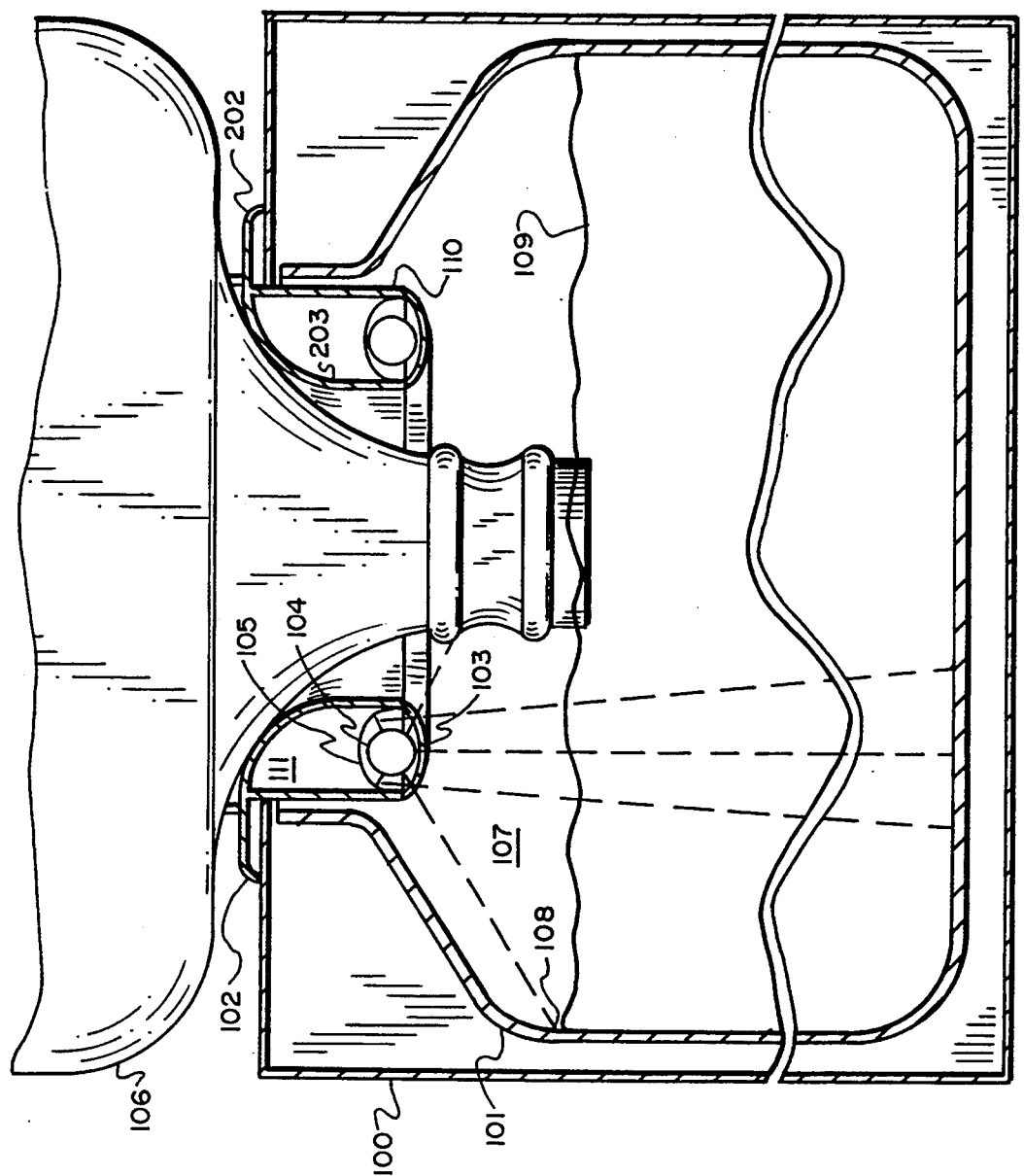
FIG. 1 is a cross-sectional view of a bottled water dispensing apparatus incorporating a bottle positioning collar in accordance with the invention.

Briefly referring now to FIG. 1, the invention includes a structural plastic splash guard or bottle positioning collar 102. The collar 102 incorporates within it an ultra-violet (UV) germicidal lamp 104 disposed within a reflectively coated concave lamp chamber 105, and a UV-transparent, cleanable window section 103.

More particularly, as shown in FIG. 1, a water cooler or dispenser consists of a dispenser cabinet 100 having disposed therein a water-holding tank 101 formed of glass or some other suitable material. The plastic molded collar 102 is positioned within the upper portion of the dispenser cabinet 100. The collar 102 provides positioning and support for the water bottle 106 as illustrated, but may also simply function to prevent water from being splashed between the water dispenser cabinet 100 and the water-holding tank 101 during replacement of the water bottle 106.

Figure 2:
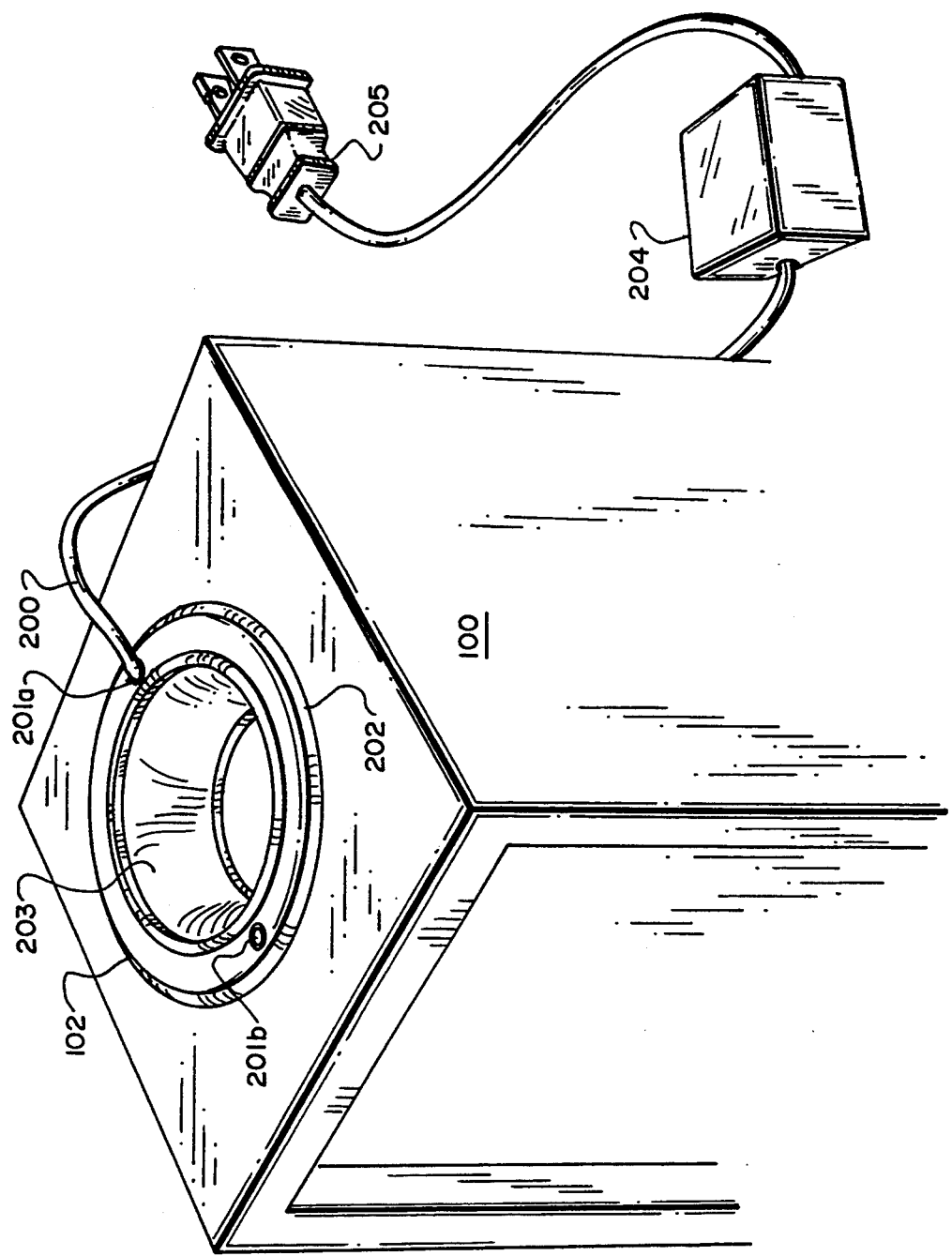
FIG. 2 is a perspective view of the collar and base unit.

The bottle positioning collar 102 is typically formed in an overall ring or torridal shape from a suitable material such as structural molded plastic, and incorporates various elements as shown in FIGS. 1 and 2. In particular, a flat upper ring section 202 is used to maintain the position of the plastic collar 102 in place on top of the water dispenser cabinet 100. A tapered throat portion 203 extends downwardly into the water dispenser cabinet 100 to assist in holding the neck of the water bottle 106 in position within the tank 101. An outer annular member 110, having a greater diameter than the throat 203, forms a concave lamp chamber 105 with the throat 203. The lamp chamber 105 houses the ultra-violet germicidal lamp 104. The window section 103 is disposed at the lower portion of the collar 102 between the throat 203 and annular member 110; the facing surfaces of the outer annular member 110 and throat 203 are typically reflectively coated.

Because of the reflective coating, the lamp chamber 105 directs substantially all of ultra-violet energy radiating from the lamp 104 in a direction towards the water holding tank 101 interior as shown by the dashed lines 108. A space 111 formed above the ultra-violet lamp 104 assist in maintaining the temperature of the lamp 104 as well as additional and physical protection of the lamp 104 when the bottle 106 is installed or removed from the base 100.

The flat ring 202 may have a pair of apertures 201a and 201b formed therein. One such aperture 201a admits a cable 200 providing access to an electrical power cord 205 via a control unit 204. The other aperture 202b provides visual access to interior of the cabinet 100, if desired, thereby permitting one to determine when the lamp 104 is in the on state. This is a safety feature in that the water bottle 106 should only be removed or changed when the lamp 104 is off. The lamp 104 can be turned off as needed by unplugging the power cord 205 from an AC outlet.

Figure 3:
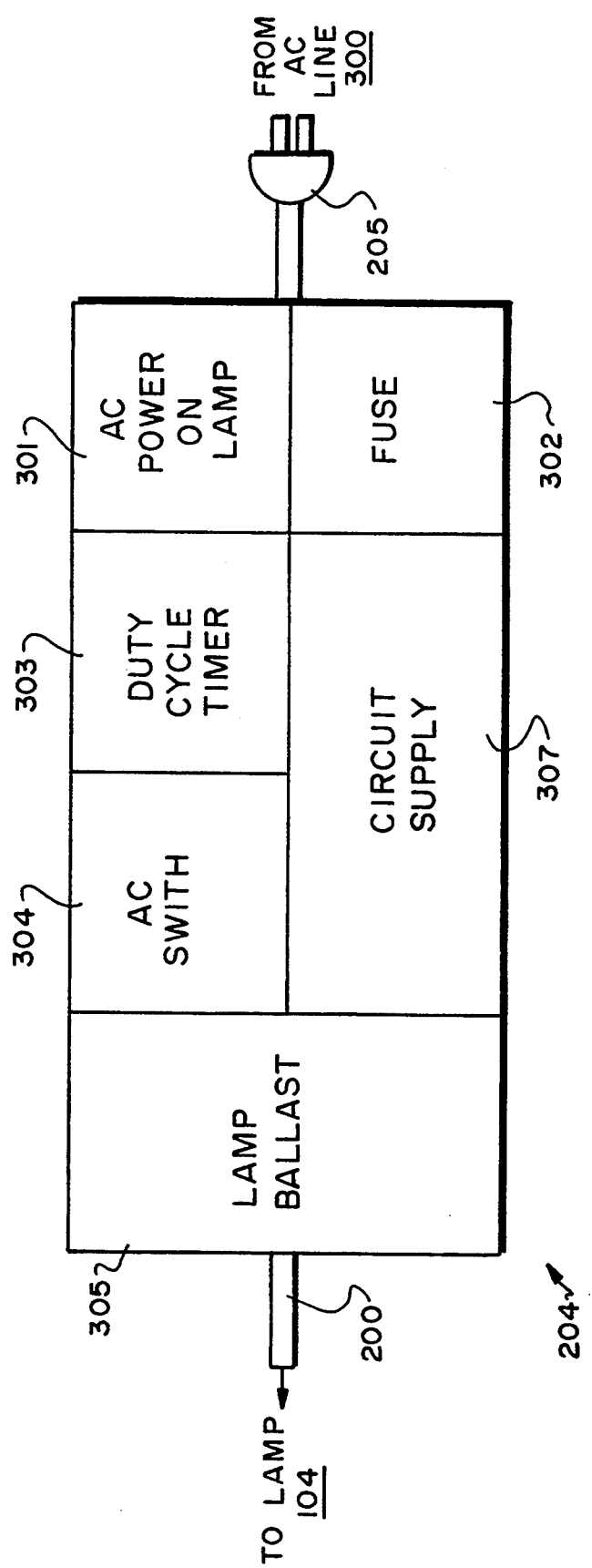
FIG. 3 is a block diagram of the electrical components of the inventive system.

The control unit 204 is typically implemented as a floor unit in retrofit applications but may also be incorporated into the cabinet 100 if desired. As shown in FIG. 3, the control unit 204 incorporates the various features of a electrical supply including a power cord 205 to connect to a primary alternating current (AC) source 300, a power on lamp indicator 301, a safety fuse 302, a circuit power supply 307, a duty cycle timing circuit 303, an AC switch 304, and a lamp ballast 305, which provides a power signal to the UV lamp via an electrical supply cable 200.

Using the techniques that are well known, the duty cycle timer circuit 303 alternatively switches the AC switch 304 on and off with various cycle times, which in turn switch the AC on and off to the lamp 104. A typical on duration is two (2) hours, and the typical off duration is approximately six (6) hours.

The above-described disinfecting apparatus may be modified in several different ways without departing from the basic advantages. For example, the collar 102 may be formed in other than the illustrated ring shape, such as square, hexagonal, octagonal, etc.

In addition, the UV lamp 104 may be formed from several lamp sections that are each of various shapes, such as straight, c-shaped, and so forth, depending upon what is the most economical and/or dependable fixture shape for a given collar shape.

Furthermore, if it is desirable to insure that the UV lamp 104 is in the off state when the bottle 106 or collar 102 is removed, an integral safety switch may be disposed along the periphery of the collar 102 and positioned such as to toggle its position when the weight of the bottle 106 is removed from the collar 102, or when the collar 102 is removed from the cabinet 100.

Also, an ultrasonic device such as a piezoelectric ultrasonic signal source may be incorporated in to the collar to generate ultrasonic noise, if desired, in order to promote stirring of the water in the holding tank 101, thereby aiding the process of exposing the water to the UV lamp 104.

In view of the above, while we have shown and described several embodiments in accordance with the present invention, it is to be understood that the invention is not limited thereto, but is susceptible to numerous changes and modifications as known to a person skilled in the art, and we therefore do not wish to be limited to the details shown and described herein but intend to cover all soughts of changes and modifications as are obvious to one of those of ordinary skill in the art.

What is claimed is:

1. A water dispensing apparatus for providing drinking water from a water bottle, comprising:
    a dispensing cabinet including a water holding tank which receives water from the water bottle, and
    a bottle positioning collar having disposed therein an ultra-violet (UV) germicidal lamp, wherein the collar further comprises
        a ring section disposed along the top section of the collar to support the bottle positioning collar against an upper periphery of the dispensing cabinet;
        a throat portion extending downwardly from an upper portion of the bottle positioning collar into the water dispenser cabinet towards the neck of the water bottle when the water bottle is inverted in place; and
        the bottle positioning collar forming a lamp chamber, the lamp chamber being formed by the downwardly extending throat portion and an outer annular member within which the ultra-violet germicidal lamp is disposed.

2. A water dispensing apparatus as in claim 1 wherein the downwardly extending throat portion and the annular member include interior facing surfaces which are reflectively coated to thereby direct substantially all the ultra-violet energy radiating from the ultra-violet germicidal lamp in a direction towards the water holding tank.

3. A water dispensing apparatus as in claim 2 additionally comprising a control unit adapted to be coupled to the ultra-violet germicidal lamp and periodically cycling a source of electrical power to the ultra-violet germicidal lamp.

4. A water dispensing apparatus as in claim 1 wherein the collar is removable for cleaning.

5. A bottle positioning collar for use with a water dispensing apparatus, comprising:
    an upper supporting section disposed along a top section of the bottle positioning collar to support the positioning collar against an upper periphery of a dispensing cabinet;
    a throat portion extending downwardly from the upper supporting section of the bottle positioning collar for supporting a water bottle when a water bottle is inverted in place on the bottle positioning collar; and
    a lamp support, the lamp support being formed by the downwardly extending throat portion, the lamp support having an ultra-violet germicidal lamp disposed thereon.

6. A bottle positioning collar as in claim 5 wherein the downwardly extending throat includes an interior facing surface which is reflectively coated to thereby direct ultra-violet energy radiating from the ultra-violet germicidal lamp in a direction towards a water holding tank positioned beneath the bottle positioning collar.

7. A bottle positioning collar as in claim 5 additionally comprising a control unit adapted to be coupled to the ultra-violet germicidal lamp and periodically cycling a source of electrical power to the ultra-violet germicidal lamp.

8. A bottle positioning collar as in claim 5 wherein the collar includes means for removably mounting the collar to a water dispenser so that the collar may be removed from the water dispenser for cleaning.

* * * * *